(12) United States Patent
Rope et al.

(10) Patent No.: US 8,989,587 B2
(45) Date of Patent: Mar. 24, 2015

(54) OPERATIONAL STATE INFORMATION GENERATION IN AN OPTICAL TRANSCEIVER

(75) Inventors: Todd Rope, Glendale, CA (US); Mark Heimbuch, Chatsworth, CA (US)

(73) Assignee: Source Photonics, Inc., Chatsworth, CA (US)

( * ) Notice: Subject to any disclaimer, the term of this patent is extended or adjusted under 35 U.S.C. 154(b) by 177 days.

(21) Appl. No.: 13/348,599

(22) Filed: Jan. 11, 2012

(65) Prior Publication Data
US 2013/0177308 A1 Jul. 11, 2013

(51) Int. Cl.
*H04B 10/00* (2013.01)
*H04B 10/079* (2013.01)
*H04B 10/40* (2013.01)

(52) U.S. Cl.
CPC ............ *H04B 10/40* (2013.01); *H04B 10/0799* (2013.01)
USPC .................... 398/135; 398/9; 398/17; 398/22; 398/137; 398/140; 398/25; 375/232

(58) Field of Classification Search
None
See application file for complete search history.

(56) References Cited

U.S. PATENT DOCUMENTS

| | | | |
|---|---|---|---|
| 6,295,318 B1 * | 9/2001 | Wingard | 375/239 |
| 6,952,531 B2 | 10/2005 | Aronson et al. | |
| 7,079,775 B2 | 7/2006 | Aronson et al. | |
| 7,177,547 B1 * | 2/2007 | Case et al. | 398/135 |
| 2002/0149821 A1 * | 10/2002 | Aronson et al. | 359/152 |
| 2007/0183782 A1 * | 8/2007 | Farr et al. | 398/104 |
| 2008/0205902 A1 * | 8/2008 | Moriwaki et al. | 398/182 |

OTHER PUBLICATIONS

Todd Rope; "Dynamic Memory Allocation in an Optical Transceiver"; U.S. Appl. No. 13/070,358; Filed Mar. 23, 2011.
Todd Rope; "Operational Status Flag Generation in an Optical Transceiver"; U.S. Appl. No. 13/075,092; Filed Mar. 29, 2011.

* cited by examiner

*Primary Examiner* — Ken Vanderpuye
*Assistant Examiner* — Merlin Brito Peguero
(74) *Attorney, Agent, or Firm* — Andrew D. Fortney; Central California IP Group, P.C.

(57) ABSTRACT

Methods, algorithms, architectures, circuits, and/or systems for determining the status of parameters associated with optical transceiver operation are disclosed. The method can include (a) accessing and/or monitoring parametric data for each of a plurality of parameters that are related to operation of the optical transceiver; (b) storing the parametric data in one or more memories; (c) comparing the parametric data for each of the plurality of parameters against at least one of a corresponding plurality of predetermined thresholds; and (d) generating one or more states indicating whether the parametric data for a unique one of the parameters has crossed one or more of the corresponding plurality of predetermined thresholds. The invention also relates to an optical triplexer, comprising the described optical transceiver.

22 Claims, 6 Drawing Sheets

OPERATIONAL STATE INFORMATION GENERATION IN AN OPTICAL TRANSCEIVER

FIELD OF THE INVENTION

The present invention generally relates to the field of optical transceivers. More specifically, embodiments of the present invention pertain to state information generation for data related to one or more operations of an optical transceiver.

DISCUSSION OF THE BACKGROUND

Optical transceivers send and receive data in an optical form over an optical link, such as a fiber-optic link. An optical transmitter can include laser driver circuitry to drive a laser or diode, such as a light-emitting diode (LED), to create optical pulses on the fiber-optic link from received electronic signals. An optical receiver can include a photosensitive diode to receive optical signals, which are then converted into electronic signals. Thus, an optical transceiver converts (i) optical signals into analog and/or digital electronic signals, and (ii) electronic signals into optical signals.

In order to determine if the optical transceiver is functioning correctly, various operational parameters are monitored. Flags are then generated to demonstrate the status of the operational parameters. In conventional approaches, the flags indicate whether a parameter is greater than or less than a predetermined threshold value. For example, a flag may indicate that a monitored temperature value is slightly greater than a predetermined temperature value (e.g., a high temperature warning threshold). In some embodiments, a flag may indicate that a monitored temperature value is significantly greater than a predetermined temperature value (e.g., a high temperature alarm threshold). Thus, conventional transceivers monitor certain parameters to generate one or more flags that indicate when a parameter value is higher or lower than a predetermined operating value.

However, a drawback of this approach is that multiple flags may be indicated at the same time, or in rapid succession, resulting in conflicting or ambiguous indications. For example, a flag-based system may generate a warning flag and, subsequently, an alarm flag as the value of a parameter rises past the warning threshold and then past the alarm. A user checking the system may see two flags: a warning flag and an alarm flag. However, the user does not know whether the parameter value is still in an "alarm" state, or whether the value of the parameter has since lowered or decreased, for example, to the "warning" level, but has not updated the alarm flag. A user may have to assume that the parameter value is still at an "alarm" level, which would necessitate drastic and possibly unnecessary action, or request further data from the device, reducing the efficiency of operation. As a result, this system does not provide adequate information to a user.

Furthermore, in conventional single-bit flag systems, a register may be a predetermined number of bits wide, and each bit may correspond to a flag. An exemplary mapping of flag values to states is shown in Table 1.

TABLE 1

| Binary Flag Values | State |
|---|---|
| 0000 | Normal |
| 0001 | Below Warning Low |
| 0011 | Below Alarm Low |

TABLE 1-continued

| Binary Flag Values | State |
|---|---|
| 0100 | Above Warning High |
| 1100 | Above Alarm High |

However, the above configuration leaves many combinations of flag values unused because they provide little or no usefulness to the user (e.g., binary code 1111, representing a simultaneous indication of "Alarm Low" and "Alarm High"). Thus, in a conventional method or device, there may be a relatively large amount of memory overhead and/or resources wasted in storing, accessing, and processing flag data relating to one or more parameters of the device.

SUMMARY OF THE INVENTION

Embodiments of the present invention relate to methods, algorithms, architectures, circuits, software, and/or systems for generating operational state information in optical transceivers. However, such systems, methods, etc. can also be applied to devices other than optical transceivers, for example, any type of system or method having multiple operational thresholds for a given parameter, and in which operational state information is desired to be tracked.

In one embodiment, an optical transceiver can include (a) an optical receiver configured to receive optical data; (b) an optical transmitter configured to transmit optical data; (c) one or more memories configured to store, for each of a plurality of parameters that are related to operation of at least one of the optical receiver and the optical transmitter, (i) parametric data, (ii) a plurality of thresholds, and (iii) one or more states indicating whether a corresponding one of the plurality of parameters has crossed at least one of the plurality of thresholds; (d) logic configured to compare the parametric data for each of one or more of the plurality of parameters against at least a corresponding one of the plurality of thresholds to generate the one or more states; and (e) an interface configured to provide (i) the one or more states and/or (ii) a plurality of status flags for the one or more of the plurality of parameters, the status flags corresponding to or decoded from at least a most recent one of the one or more states stored in the memory. This invention further relates to an optical triplexer that includes such an optical transceiver.

In another embodiment, a method of generating operational state information in an optical transceiver can include (a) accessing and/or monitoring parametric data for each of a plurality of parameters that are related to operation of the optical transceiver; (b) storing the parametric data in one or more memories; (c) comparing the parametric data for each of the plurality of parameters against at least one of a corresponding plurality of predetermined thresholds; and (d) generating one or more states indicating whether the parametric data for a unique one of the parameters has crossed one or more of the corresponding plurality of predetermined thresholds.

Embodiments of the present invention can advantageously provide an approach that calculates an operational state by comparing parametric data to threshold values. Embodiments of the present invention also provide an approach which determines (and notifies a user of) a change of operational state by comparing a current operational state to a stored operational state for a given parameter. Embodiments of the present invention further provide a method whereby the information for each state may be contained in a multi-bit code. Embodiments of the present invention allow for more accurate and more current information relating to operational parameters, resulting in improved operational status determinations for and interoperability of an optical transceiver. These and other advantages of the present invention will become readily apparent from the detailed description of preferred embodiments below.

DETAILED DESCRIPTION OF THE PREFERRED EMBODIMENTS

Figure 1:
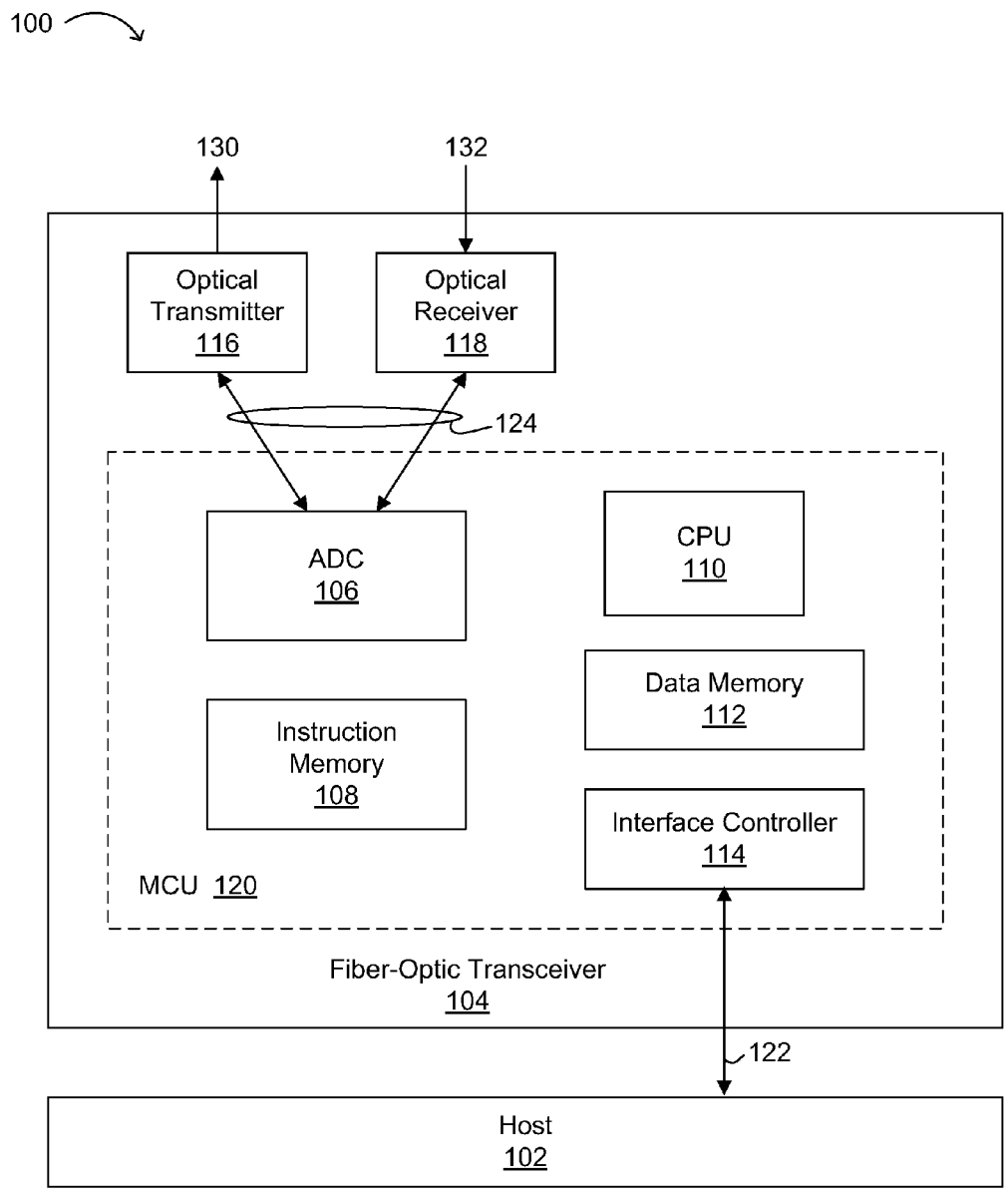
FIG. 1 is a block diagram showing an exemplary optical transceiver system in accordance with embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the disclosure.

Some portions of the detailed descriptions which follow are presented in terms of processes, procedures, logic blocks, functional blocks, processing, and other symbolic representations of operations on code, data bits, or data streams within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "calculating," "determining," or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

Furthermore, in the context of this application, the terms "wire," "signal," "cable" and "bus" refer to any known structure, construction, arrangement, technique, method and/or process for physically transferring a signal from one point in a circuit to another. Also, unless indicated otherwise from the context of its use herein, the terms "designated," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Similarly, for convenience and simplicity, the terms "time," "rate," "period" and "frequency" are, in general, interchangeable and may be used interchangeably herein, but are generally given their art-recognized meanings Also, for convenience and simplicity, the terms "data," "bits," "bit string," and "information" may be used interchangeably, as may the terms "coupled to," and "in communication with" (which may refer to direct or indirect connections, couplings, or communications), but these terms are generally given their art-recognized meanings herein.

According to various embodiments of the present invention, an architecture or circuit for operational state information generation, suitable for use in optical transceiver systems, is provided. In general, an optical transceiver in accordance with particular embodiments includes a logic circuit (e.g., microprocessor or microcontroller) that calculates an operational state of one or more parameters and provides an indication of when a change in the state of one or more parameters has occurred. The invention, in its various aspects, will be explained in greater detail below with regard to exemplary embodiments.

An Exemplary Operational State Information Generation System

FIG. 1 illustrates an exemplary optical transceiver system 100 in accordance with embodiments of the present invention. Optical transceiver system 100 can include optical transceiver 104 (e.g., a fiber-optic transceiver) and host 102. Host 102 can be a host processor, circuit board, stand-alone optical network device (e.g., repeater, optical switch, set-top box, etc.) or any other component or device including a suitable controller or processor. Host 102 can interface with optical transceiver 104 via communications interface 122. For example, communications interface 122 can be a serial interface. Alternatively, communications interface 122 can be a parallel interface including a plurality of bit signals.

Optical transceiver 104 can include a microcontroller unit (MCU) 120, optical transmitter 116, and optical receiver 118. For example, optical transmitter 116 can include a light-emitting diode (LED), laser diode, or any other suitable device for generating light pulses (e.g., optical signals) over an optical signal medium 130 (e.g., a fiber-optic link). Optical receiver 118 can be a photodiode or any other device configured to receive an optical signal 132 and convert the received optical signal into an electrical signal. MCU 120 can, alternatively, be a logic (circuit), application specific integrated circuit (ASIC), programmable logic device (PLD), complex PLD (CPLD), field-programmable gate array (FPGA), or system on chip (SOC), which performs similar functions. Optical signals 130 and 132 may be separate optical links, or may be part of a common fiber-optic link or any other suitable optical connection (e.g., optical waveguide, multi-mode fiber[s] [MMF], single-mode fiber[s] [SMF], etc.). In addition, an optical duplexer, an optical triplexer, or other multiple transceiver configurations can be formed by including two or more optical transceivers 104 or components thereof (e.g., two or more optoelectronic transmitters with a single optoelectronic receiver).

Analog electronic signals 124 are transmitted between analog-to-digital converter (ADC) 106 and optical transmitter 116, and between optical receiver 118 and ADC 106. Analog electronic signals 124 can accommodate or represent optical signal information in an electronic form. ADC 106 can then convert these electronic signals from an analog form into a digital form to enable or allow for digital processing within MCU 120. MCU 120 can further include interface controller 114, central processing unit (CPU) or microprocessor 110, instruction memory 108, and data memory 112. MCU 120 generally receives and transmits communications with host 102 over host communications interface 122.

In certain embodiments, instruction memory 108 is a non-volatile memory, and data memory 112 is a volatile memory (e.g., RAM). However, instruction memory 108 can alternatively be a volatile memory, or may contain portions of both non-volatile and volatile memories. Also, data memory 112 can alternatively be a non-volatile memory, or may contain portions of both volatile and non-volatile memories. Examples of non-volatile memories include electrically erasable programmable read-only memory (EEPROM), Flash EEPROM, magnetoresistive RAM (MRAM), laser programmable memories (e.g., fuse-based), or any other suitable type of ROM or non-volatile storage. Examples of volatile memories include static random-access memory (SRAM), dynamic RAM (DRAM), or any other suitable type of RAM or volatile storage element that maintains a stored state when power is applied.

In addition, while data memory 112 is generally described herein as storing parametric data related to transceiver operation(s), as well as associated thresholds (e.g., for use in determining whether a particular parameter in the parametric data crosses a corresponding threshold from an associated threshold register), such data and/or information can alternatively or additionally be stored in instruction memory 108. For example, considerations of performance, memory availability, and operational efficiency can be used to determine whether parametric data and/or threshold data are stored in instruction memory 108 and/or data memory 112. In some applications, instructions can be stored in RAM or other data memory for performance reasons. Further, various data memory (e.g., threshold data) can be stored in ROM or other non-volatile memory for efficiency reasons, such as when the stored data does not change or changes relatively infrequently.

An Exemplary Optical Transceiver

In one example, an optical transceiver can include (a) an optical receiver configured to receive optical data; (b) an optical transmitter configured to transmit optical data; (c) one or more memories configured to store, for each of a plurality of parameters that are related to operation of at least one of the optical receiver and the optical transmitter, (i) parametric data, (ii) a plurality of thresholds, and (iii) one or more states indicating whether a corresponding one of the plurality of parameters has crossed at least one of the plurality of thresholds; (d) logic configured to compare the parametric data for each of one or more of the plurality of parameters against at least a corresponding one of the plurality of thresholds to generate the one or more states; and (e) an interface configured to provide (i) the one or more states and/or (ii) a plurality of status flags for the one or more of the plurality of parameters, the status flags corresponding to or decoded from at least a most recent one of the one or more states stored in the memory. This invention further relates to an optical triplexer that includes such an optical transceiver.

Figure 2:
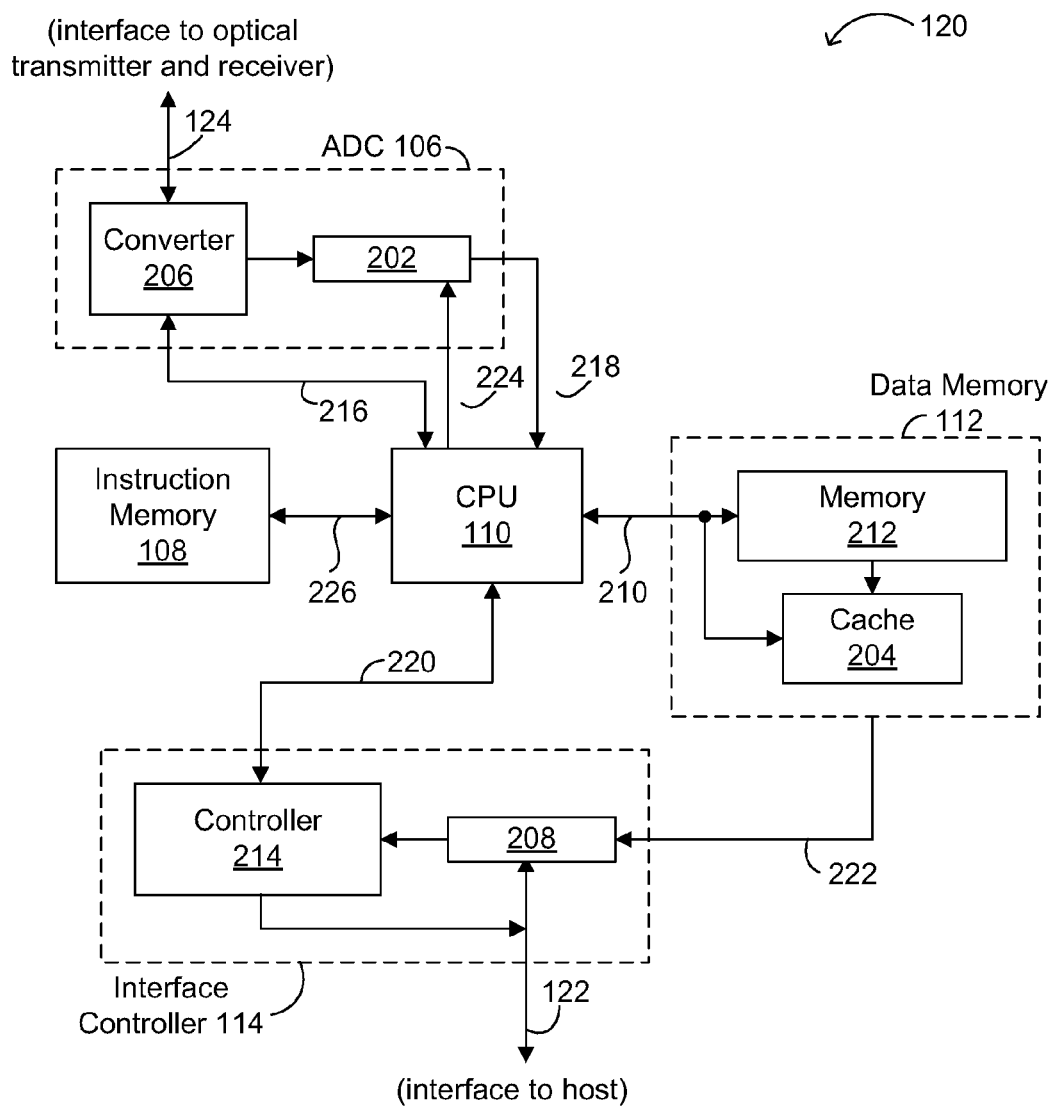
FIG. 2 is a block diagram showing an exemplary microcontroller for an optical transceiver in accordance with embodiments of the present invention.

FIG. 2 illustrates an exemplary microcontroller 120 for an optical transceiver in accordance with embodiments of the present invention. ADC 106 can interface with an optical transmitter and an optical receiver (not shown) via optical information signals 124. CPU 110 may utilize control signal 216 for interacting with ADC 106 via converter 206. Register 202 can contain an output for ADC 106 by capturing output data from converter 206. Data output from ADC 106 (e.g., at ADC output register 202) can be adjusted (e.g., by formula, calibration, re-programming, etc.) such that different data is accessed. In some cases, a demultiplexer (not shown) or a bank of registers may be used in addition to, or in place of, register 202 in order to support a higher rate of data output from converter 206. For example, data can be output from converter 206 into a bank of registers in a sequential or round-robin fashion. In the example of a demultiplexer, data output from converter 206 may be sent via the various demultiplexer outputs to CPU 110.

For example, register 202 can include parametric data related to operation(s) of optical transmitter 116 and/or optical receiver 118 (see, e.g., FIG. 1). As discussed above, register 202, while shown in FIG. 2 as a single register, can also be implemented as a bank of registers, or an otherwise larger memory portion for capturing larger amounts of data from ADC 106. In some embodiments, ADC 106 is used to monitor a first operating parameter (e.g., parametric data related to operation(s) of optical transmitter 116 and/or optical receiver 118), and a second ADC (not shown) is used to monitor a second operating parameter different from the first operating parameter. Alternatively, multiple ADCs 106 may be used to monitor various first operational parameters. Various parametric data can be captured in a serial fashion or in parallel. As a result, although the output of converter 206 is generally multi-bit (e.g., n bits wide, where n is a integer of at least 2, such as 4, 6, 8, 10, 12, 16, 32, etc.), the data output by register 202 may be serial or parallel. In order for CPU 110 to retrieve this parametric data, data access control signal 224 can be activated by CPU 110. In response to control signal 224, data from register 202 can be output via ADC output signal/bus 218.

Parametric data can be supplied to ADC output register 202 and/or accessed by CPU 110 (via ADC output signal/bus 218) at a predetermined frequency and/or on-demand. For example, converter 206 can periodically update register 202 during normal operation of ADC 106 and/or CPU 110. If data access control signal 224 is held in an active state, CPU 110 can receive the periodically updated data from register 202 via ADC output signal 218 at this same frequency. For example, this parametric update rate can vary from about 1 ms to about 100 ms (e.g., about 50 ms), or at any other update rate within this range or outside this range, depending on the operating frequencies of ADC 106 and CPU 110 and the design of register 202 (e.g., whether it is or is part of a bank of registers, whether it includes a demultiplexer, etc.). Certain embodiments may also support a plurality of parametric data update rates (e.g., different update rates for different parameters), including variable update rates for one or more of the parameters for which data are periodically updated.

In some applications, this parametric data update rate can be programmed by a user. For example, a variety of supported update rates can be presented to a user for selection via a graphical user interface (GUI). Also, while a given parametric data update rate can be selected or otherwise fixed, parametric data can also be updated upon demand, such as in response to a state information request from host 102. In some cases, an option (e.g., a user option) can be employed whereby the parametric data is designated to be determined periodically or only updated upon demand. In other cases, on-demand parametric data updating can essentially act as an override to an otherwise periodic parametric data update mode. Thus, parametric data can be updated via register 202 and ADC output signal 218 periodically and/or upon demand, and these parametric data update modes may depend on particular applications, certain parameters, as well as customer/user configurations. An optical transceiver and/or method of generating state information relating to parameters of an optical transceiver according to the present invention may include a digital diagnostic monitoring interface (DDMI) that reports values and/or states of various parameters (see, e.g., U.S. patent application Ser. No. 13/427,691, filed Mar. 22, 2012, the relevant portions of which are incorporated by reference herein).

CPU 110 can retrieve (e.g., fetch and/or pre-fetch) instructions from instruction memory 108 via interface signals 226. CPU 110 can also interface with data memory 112 via bus(es) 210. For example, parametric data received from ADC output 218 can be provided on bus(es) 210 to data memory 112 for storage. Bus(es) 210 may be a single bus or multiple-bit bus configured for serial and/or parallel communication, and may support unidirectional and/or bidirectional signaling. CPU 110 can also send control signals on bus(es) 210 to control accessing of parametric data and thresholds (e.g., threshold values) from data memory 112 in order to calculate operational state information therefrom. Such accessing of parametric data and thresholds from data memory 112 may be performed periodically and/or in response to on-demand requests, such as requests from host 102 to retrieve an operational state (e.g., to obtain an operational status and/or modify or set a threshold). For example, data memory 112 can be accessed by CPU 110 and provide parametric data and thresholds at substantially the same rate that ADC output signal 218 is updated, or at a higher or lower rate.

In one example, data memory 112 can include memory portion 212 and cache portion 204. Cache portion 204 can be a smaller and faster memory (e.g., have a smaller capacity/density and be configured to operate at a higher frequency) relative to the remaining portion of data memory 112. Memory portion 212 and/or cache portion 204 can also include a variety of registers that can be allocated for storage of parametric data, threshold values, error checking code, percentage variances, percentage differences, and comparison results. Further, memory portion 212 and cache portion 204 can be subdivided into any number of blocks or other arrangements (e.g., different integrated circuits [ICs]) of memory. In this particular exemplary arrangement, cache portion 204 can provide data memory output signal 222 to interface controller 114.

For example, cache portion 204 may store copies of certain parametric data and associated thresholds that are most likely to be requested by CPU 110 for state (or state information) calculation. In one embodiment, a user may configure a predetermined number of parameters and/or thresholds to be stored in cache portion 204 and memory portion 212 such that an associated operational state can be calculated and provided to host 102 in less processing time than methods not utilizing a cache portion 204. Alternatively, copies of parametric data and associated thresholds in memory portion 212 can be made in cache portion 204 based on other factors, such as parametric data and/or thresholds that are most recently written to or stored in memory portion 212, or parametric data and thresholds that correspond to an operational state information most recently requested by host 102. In this fashion, cache portion 204 may effectively be used to decrease operational state calculation time (e.g., to service a request from host 102).

In certain embodiments, MCU 120 maintains parametric data, thresholds, and (optionally) error checking code, percentage variance(s), percentage difference(s), threshold comparison results (operational statuses), and the latching of thresholds in data memory 112. A request for state information (or status indication) can be received by interface controller 114 via host communications interface 122. The operational state request (e.g., from host 102) can include an identifier for the requested threshold register. Register 208 can store the incoming threshold register identifier as well as associated outgoing threshold information. Alternatively, separate registers can be used to store incoming identifier information and outgoing threshold data. Controller 214 (e.g., microcontroller, programmable logic device [PLD], complex PLD [CPLD], field-programmable gate array [FPGA], application-specific integrated circuit [ASIC], system on chip [SOC], etc.) within interface controller 114 can send the request to CPU 110 using command signal(s) 220. CPU 110 may then correlate or map the identifier from the state information request to particular memory locations in data memory 112 at which the corresponding parametric data and associated thresholds are located. For example, CPU 110 may maintain a table that maps the identifier from the state information request to the appropriate storage locations in data memory 112 so that CPU 110 can retrieve corresponding parametric data and thresholds for calculation of the requested state information (e.g., alarm and/or warning; see, e.g., U.S. patent application Ser. Nos. 13/070,358 and 13/075,092, filed Mar. 23, 2011 and Mar. 29, 2011, respectively.)

Once CPU 110 receives the operational state (state information) request via command signal/bus(es) 220, CPU 110 can send a memory read request to data memory 112 via signal 210. Once the request command, or a version or derivative thereof (e.g., an operational state identifier), received on host communications interface 122 is sent to CPU 110 via command signal 220, CPU 110 can issue a read command via bus(es) 210 to data memory 112. As part of this process, CPU 110 can effectively translate information received from host 102 as part of the operational state request into actual memory locations that store the parametric data and associated thresholds to be accessed in order to calculate the requested state information (or alarm/warning). The operational state information can then be sent from the CPU 110 to the data memory 112, and read from data memory 112 via memory output signal 222. Alternatively, the operational state indication may be directly sent from CPU 110 to interface controller 114.

In any event, interface control register 208 can receive the requested state information, which may then be provided to host 102 via host communications interface 122. As discussed above, interface control register 208 may also be used to store the incoming identifier parsed or derived from the state information request from host 102. In this case, register 208 may be wide enough (e.g., 16 bits wide, 32 bits wide, 64 bits wide, 128 bits wide, etc.) to accommodate such incoming request information and outgoing state information. Alternatively, separate registers (e.g., having a width of 4 bits, 8 bits, 16 bits, 32 bits, 64 bits, etc.) can be used to store incoming state identifier information and outgoing state information value data. Further, various registers and storage locations discussed herein may also be lumped together in the same memory block or other similar storage structure.

Figure 3:
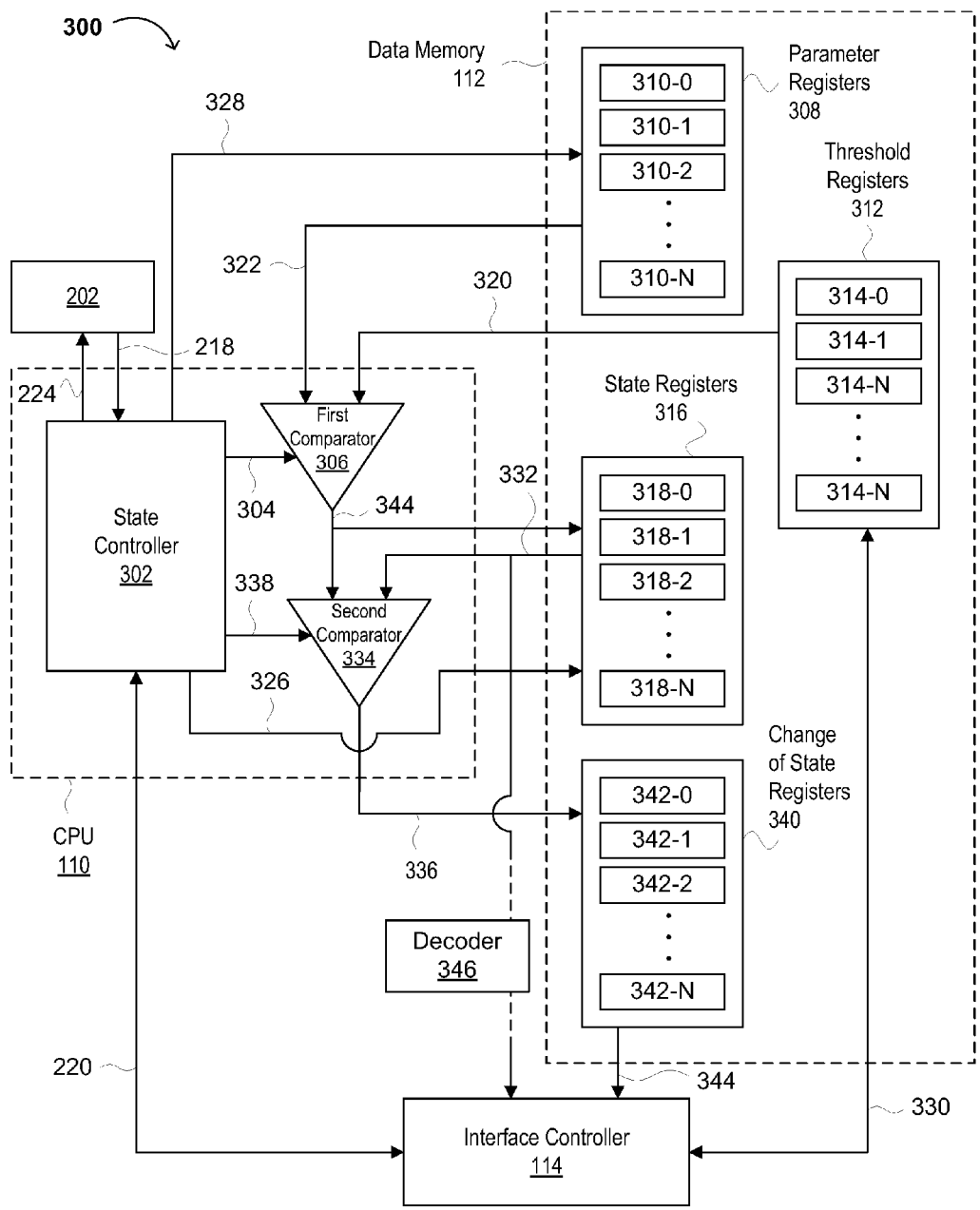
FIG. 3 is a block diagram showing an exemplary state information generation control structure in accordance with embodiments of the present invention.

FIG. 3 illustrates an exemplary state information generation control structure 300 in accordance with embodiments of the present disclosure. State controller 302 in CPU 110 can activate signal 224 to read the parametric data in ADC output register 202 on ADC output signal/bus 218. State controller 302 can then write the accessed parametric data into parameter registers 308 via bus 328. Buses and/or signals 320, 322, 324, 326, 328, 332 and 334 shown in FIG. 3 may represent more detailed versions of the bus(es) 210 shown in FIG. 2. Parameter registers 308 can include any number of registers 310 (e.g., 310-0, 310-1, 310-2, . . . 310-N). As discussed above, ADC output register 202 may be implemented as a bank of registers instead of one register, and parameter registers 308 may form this bank of registers as a replacement for, or in addition to, ADC output register 202.

Threshold registers 312 can include various individual registers 314 (e.g., 314-0, 314-1, 314-2, . . . 314-N) for storing thresholds (which can be data or percentages) for use in determining whether a particular parameter 310 crosses a corresponding threshold value from a threshold register 314. Bus(es) 330 can be used to provide updated threshold values from interface controller 114 to threshold registers 312 to reprogram the threshold registers 312. In one embodiment, threshold registers 314 may store a plurality of thresholds corresponding to a given parameter, for use in calculating a corresponding number of operational states. Such thresholds can include both a low threshold and a high threshold to indicate when a given parameter value falls within a predetermined range or is outside the range. In a 2-bit system, when parametric data is greater than or equal to the high threshold, corresponding operational state information may indicate this status with a first state, and when the parametric data is less than the low threshold, corresponding operational state information may indicate this status with a second state. When the parametric data is normal (e.g., between the low and high thresholds), corresponding state information may indicate this status with a third state. A fourth 2-bit state may indicate failure (e.g., of the system) or a "don't care" state (e.g., when the value of the parameter is not relevant to operation of the transceiver).

A higher number of thresholds (e.g., 4, 6, 8, etc.) can also be used to designate multiple threshold ranges. For example, threshold registers 314 may store a plurality of thresholds configured to indicate a low warning, a low alarm, a high warning, and a high alarm, to form a narrower range (e.g., corresponding to the low and high warnings) within a wider range (e.g., corresponding to the low and high alarms). In one example, a "warning" state may indicate an operable system, but in which the system does not ensure or guarantee continued operability. On the other hand, an "alarm" state may represent a possible imminent shutdown of the system. Thus, the alarm state(s) may indicate that the system is at risk of shutdown due at least in part to the associated operational parametric data meeting or exceeding the designated alarm threshold. Further, for a given target value of a parameter, the alarm thresholds may represent about ±10%, ±20%, or ±30% of that target value (or any other range considered appropriate for a given parameter), while the warning thresholds (which have an absolute value smaller than the corresponding alarm thresholds) may represent about ±5%, ±10%, or ±15% of the target value. In certain embodiments, acceptable threshold values and ranges (e.g., ±15%, ±20%, etc.) about target parameter values can be programmed and stored in threshold registers 314.

For example, a 3-bit coding scheme can be utilized to implement states for a system employing high and low warning and alarm thresholds, as shown in Table 2:

TABLE 2

| Number | Binary Code | State |
| --- | --- | --- |
| 0 | 000 | Normal |
| 1 | 001 | High Warning |
| 2 | 010 | High Alarm |
| 3 | 011 | Don't Care |
| 4 | 100 | (Reserved) |
| 5 | 101 | Low Warning |
| 6 | 110 | Low Alarm |
| 7 | 111 | Failure |

The "(Reserved)" state in Table 2 above may represent a state which is reserved for use by the user or manufacturer of the device, and may represent a particular state or item of information of importance to the user/manufacturer for that given parameter.

Thresholds may correspond to percentages (e.g., 15%, 30%, 45%, etc.) above or below a predetermined value for each parameter. The thresholds can be pre-programmed (e.g., "default") values or automatically rewritten depending on a value of a second parameter. A detailed description of changing thresholds based upon the status of a second parameter may be found in U.S. patent application Ser. No. 13/371,313, filed Feb. 10, 2012, the relevant portions of which are incorporated by reference herein. The thresholds can also be programmed during use of the device by the host or user. In one example, threshold values are set (or latched) during use based upon the current operational conditions of the device. For example, if current operational conditions are satisfactory, the user may provide an instruction to latch or store the target value for given parameters and their corresponding thresholds based on the current operational conditions. The thresholds may then be adjusted (e.g., the previous thresholds are replaced with new thresholds) to represent values of, e.g., 15%, 30%, and/or 45% above or below a then-current value of each of one or more of the parameters. The adjusted thresholds are not limited to variations by percentage, but rather, could be deviations of a specific amount (e.g., ±10-20 mA for bias current, ±0.5V for voltage, ±5° C. for temperature, etc.)

In determining an operational state, all threshold values stored in memory for a particular parameter may be utilized in comparing a current parametric value to the threshold values. However, it may be unnecessary and/or wasteful to access or utilize all threshold values for a particular parameter, and thus, a lesser number of threshold values may be utilized, if desired. For example, a large number of threshold values may exist for a parameter such as temperature (see Table 4 below). If temperature is monitored at a rate of one sample per second, then a temperature change of greater than, e.g., 5 or 10° C. between two consecutive samplings is virtually impossible. Therefore, logic may be implemented to restrict the access or utilization of threshold values to a limited number of threshold values which are at or near a value of a current parametric value. For example, if a current parametric value for a temperature is 100° C., then the threshold values utilized for comparison with this value may be restricted to those threshold values having a value of between 90° C. and 110° C.

Acceptable threshold register sizes (e.g., 2, 3, 4, 8, 16, or 32 bits wide, etc.), depending on CPU architecture, operating system, number of possible states, as well as other design considerations, etc., can be determined for each particular embodiment utilized. In general, parameter registers will have a register size which is relatively high (e.g., 8, 16, or 32 bits wide), and threshold registers may have the same or (slightly) lower register size. State registers may have a register size which is relatively low (e.g., 2-4 bits wide), and change of state registers may have the same or (slightly) lower register size. In some cases, the change of state can be indicated by a "changed/not changed" flag (e.g., a single bit in which "1" may indicate change of state and "0" may indicate no change in state). In certain embodiments, acceptable threshold register formats (e.g., bit maps, unsigned/signed integers, IEEE floating point, etc.) can also be supported.

In the present invention, the information for each state may be contained in a multi-bit code, such as that shown by the mapping of states and codes in Table 3, for example:

TABLE 3

| Number | Binary Code | State |
|---|---|---|
| 0 | 000 | Normal |
| 1 | 001 | 15% Above Normal |
| 2 | 010 | 30% Above Normal |
| 3 | 011 | 45% Above Normal |
| 4 | 100 | 15% Below Normal |
| 5 | 101 | 30% Below Normal |
| 6 | 110 | 45% Below Normal |
| 7 | 111 | Total Failure |

Thus, a greater amount of information can be contained and/or transmitted using only a 3-bit code (e.g., 8 states in Table 3 above, representing three pairs of high/low thresholds and an independent state), compared to less information (4 flags in Table 1 above, representing two pairs of high/low thresholds) using 4 bits of information. The result is less wasted overhead, since each possible combination of bit values (e.g., corresponding to numbers 0-7) can be utilized to provide information relating to the state of the device parameter. In this fashion, more operational state information can be provided using a fewer number of bits than the flag-based system.

Examples of parameters for which data are obtained, sampled, processed, and/or analyzed can include a temperature, a voltage (e.g., a supply voltage, regulated voltage, or a ground potential), an optical or laser bias current, an optical power (e.g., a transmitted laser optical power, a received optical power, a transmitted optical digital power, a received optical digital power, etc.), a modulation amplitude, or a modulation frequency. Information regarding an amplifier gain (e.g., provided by a TIA, automatic gain control [AGC] loop, a limited amplifier, etc.) can also be accommodated in the present state-based information. Each such parameter can be associated with one or more states to indicate the operational status of the parameter or component for which parametric data are obtained. Also, parametric data can be stored at any suitable allocated memory location, as may be determined dynamically (see, e.g., U.S. patent application Ser. No. 13/070,358, filed Mar. 23, 2011, the relevant portions of which are incorporated by reference herein).

In addition, each monitored parameter can be analyzed using a single, most-recently obtained sample (e.g., "real-time" monitoring), multiple samples taken over time, or multiple samples taken from different sources. For example, voltage, power or temperature data may represent different instances or samplings of the same parameter within a specific time period or duration. In another example, the voltage, power or temperature data may represent simultaneous or substantially simultaneous instances or samplings from each of a plurality of transceiver units in a network of such units. Thus, data relating to a given parameter (e.g., temperature data, supply voltage, regulated voltage, bias current, output power, etc.) stored at a memory location may represent an average, a range, a standard deviation, a minimum and/or maximum value, or another mathematical or statistical analysis calculation on the data (which may be stored in another memory location or locations).

Any parametric data related to optical transceiver operation(s) can be utilized for operational state information generation in particular embodiments. For example, referring to FIG. 1, temperatures of one or more structures or units in optical transceiver 104, such as the temperature of the transmitting laser, a module, the optical transmitter 116 as a whole, a circuit or IC providing a bias current to the laser, a modulator providing a modulation signal to the laser, and/or the optical receiver 118, can be compared against corresponding thresholds to determine state information. In one implementation (e.g., based on the 3-bit scheme in Table 2 above), a warning threshold for the temperature of the transmitting laser or the bias circuit can be set at a value of from about 70° C. to about 80° C. (e.g., about 75° C.), and an alarm threshold for the same parameter(s) can be set at a value of from about 80° C. to about 90° C. (e.g., about 85° C.). However, if detailed temperature information is desired to be known, one may devise a state information scheme using 4 bits of data as shown in Table 4:

TABLE 4

| Binary Code | Temperature | State |
|---|---|---|
| 0000 | 25° C. | Normal |
| 0001 | 25-40° C. | Normal |
| 0010 | 40-50° C. | Normal |
| 0011 | 50-55° C. | Normal |
| 0100 | 55-60° C. | Normal |
| 0101 | 60-64° C. | Normal |
| 0110 | 64-68° C. | Normal |
| 0111 | 68-72° C. | Normal |
| 1000 | 72-75° C. | Normal |
| 1001 | 75-77.5° C. | Warning (Low) |
| 1010 | 77.5-80° C. | Warning (Low) |
| 1011 | 80-82.5° C. | Warning (High) |
| 1100 | 82.5-85° C. | Warning (High) |
| 1101 | 85-87.5° C. | Alarm: Yellow |
| 1110 | 87.5-90° C. | Alarm: Orange |
| 1111 | >90° C. | Alarm: SHUTDOWN |

Also, for example, state information can be generated for a voltage of or in one or more structures, signals, or units in optical transceiver 104. In addition, power-related parameters, including transmitter power, radio-frequency (RF) input or output power, and/or video input or output power, can be monitored, and state information obtained and/or generated therefor. Further, state information for any other laser related data, such as laser wavelength(s) and/or channel spacing(s), can also be accommodated.

Referring back to FIG. 3, first comparator 306 may compare selected parametric data (e.g., via bus 322) against corresponding thresholds (e.g., via bus 320) to determine a state at first comparator output 344 that indicates the relative magnitude of the parametric data versus the target value and/or thresholds. For example, first comparator 306 may be a digital comparator or magnitude comparator that receives two numbers as inputs in binary form (e.g., bit strings) and determines whether a first one of the numbers is greater than, less than, or equal to the second number. First comparator output 324 may be stored in state registers 316 (e.g., 318-0, 318-1, 318-2, . . . 318-N). State registers 316 can provide this information to the host via bus and/or signal 332. The information may also be processed by a decoder 346 which can convert the state information to flags to be provided to the host via bus and/or signal 332. In some embodiments, first comparator 306 can be activated via a comparator enable signal (received from state controller 302) provided on bus 304 to compare the monitored value of the parameter to the values of the predetermined thresholds.

First comparator output 344 may be provided to both the state information registers 316 (which store the state of the parameter) and as an input to second comparator 334. Second comparator 334 also receives information from state information registers 316 via bus and/or signal 332 regarding the stored state of a given parameter. Thus, an output from state information registers 316 may be provided to both second comparator 334 and interface 114. Second comparator 334 may thereby compare state information from first comparator 306 with corresponding stored state information from state information registers 316. Second comparator 334 can determine if a current state has changed relative to the corresponding stored state, and such information (e.g., a "change of state" or "no change of state") can be output to change of state registers 340. Change of state registers 340 (e.g., 342-0, 342-1, 342-2, . . . 342-N) may provide information on each parameter's change of state (or lack of change) to the interface via bus and/or signal 344 as single bit info (e.g., a flag) or as multi-bit information (e.g., as a state, to show relative magnitude and/or a direction of change).

Optionally, a state information request can be used to request state information, in which case an identifier within the state information request (e.g., from host 102) may instruct state information generation controller 302 to access corresponding parametric data from parameter registers 308 on bus 322 and corresponding thresholds from threshold registers 312 on bus 320. First comparator 306 may then compare the parametric data against corresponding thresholds to determine a state at first comparator output 344. Control signal(s) 326 can be used to enable reading of an appropriate state register 318 (e.g., 318-0, 318-1, 318-2, . . . 318-N) from state registers 316, to be supplied via data memory output signal/bus 332 (and optionally signal/bus 344) to interface controller 114 for servicing the request from host 102. Alternatively, the first comparator 306 can provide the state (e.g., at first comparator output 344) directly to interface controller 114 in response to the request from host 102.

Functions or parameter thresholds related to operation of the optical transceiver can also be changed over time. For example, threshold registers 312 can be changed or re-programmed to change the information that is stored therein. For example, thresholds for a first parameter (e.g., bias current) may change as a function of a second parameter (i.e., as the second parameter value changes). In another example, threshold registers 312 can be programmed by a user via host 102 by way of interface controller 114. Threshold registers 312 may contain default values that may be overridden by the user or by software configured to change or update thresholds for a given parameter in response to a predetermined change or occurrence in a second parameter. For example, the thresholds may be updated and selected by state controller 302 based on a predetermined change or event in a second monitored parameter (e.g., a predetermined second parametric threshold is crossed). In some embodiments, the second parameter can be monitored periodically. A detailed description of changing thresholds based upon the status of a second parameter may be found in U.S. patent application Ser. No. 13/371,313, filed Feb. 10,2012 , the relevant portions of which are incorporated by reference herein.

Exemplary Methods of Generating Operational State Information

In a further aspect of the present invention, a method of generating operational state information in an optical transceiver can include (a) accessing and/or monitoring parametric data for each of a plurality of parameters that are related to operation of the optical transceiver; (b) storing the parametric data in one or more memories; (c) comparing the parametric data for each of the plurality of parameters against at least one of a corresponding plurality of predetermined thresholds; and (d) generating one or more states indicating whether the parametric data for a unique one of the parameters has crossed one or more of the corresponding plurality of predetermined thresholds.

Figure 4:
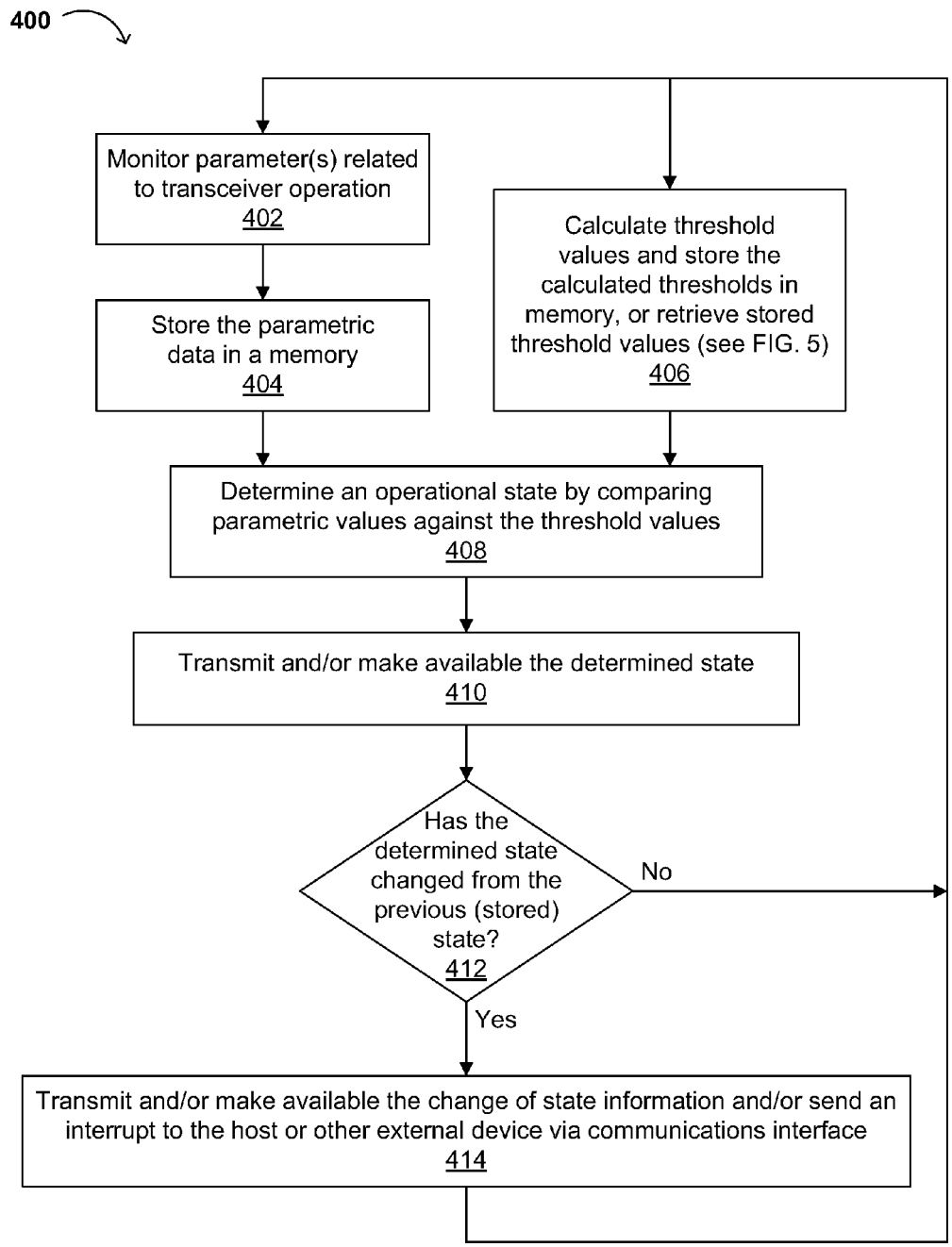
FIG. 4 is a flow diagram showing an exemplary method of generating operational state information in accordance with embodiments of the present invention.

FIG. 4 illustrates an exemplary method 400 of generating operational state information in accordance with embodiments of the present disclosure. The flow can begin at 402 and 406. At 402, parametric data related to one or more transceiver operations can be accessed and/or monitored. The accessed/monitored parametric data can then be stored in a memory at 404. For example, referring to FIGS. 1-3, CPU 110 can access parametric data from ADC output register 202 and store the parametric data at a location 310 in parameter registers 308 within data memory 112. Monitoring and storing the parametric data may include sampling the parametric data as analog information and converting the analog parametric data to a digital value. Thus, parametric data can be transferred from ADC output register 202 to a suitable location in data memory 112 (e.g., in parameter registers 308). Further, pointers to the stored parametric data can also be utilized to subsequently identify and/or find corresponding locations of the stored parametric data in data memory 112 (e.g., parameter registers 308). Alternatively, parametric data may be directly accessed by CPU 110 from ADC output register 202. In this case, the accessed parametric data may also be stored in data memory 112 (e.g., as a simultaneous or subsequent write operation to data memory 112).

At 406, threshold values may be retrieved from memory 112. Alternatively, threshold values may be calculated and stored in memory 112 prior to retrieval from the memory. Threshold values may be predetermined values stored in memory 112, may be changed as a function of change(s) in a second parameter, may be defined by the user, or, in one embodiment, may be calculated from the parametric data or the stored value in a corresponding parameter register 308 (see, e.g., FIG. 3). Referring back to FIG. 4, states (e.g., binary code values) may be calculated at 408 by comparing parametric data corresponding to one or more of the parameters against associated thresholds for the parameter(s), and generating a code, bit sequence or bit stream corresponding to the state.

At 408, a state of (or state information for) one or more parameters may be determined by comparing a real-time value for each monitored parameter against the corresponding threshold(s) for that parameter. For example, first comparator 306 (see FIG. 3) may compare a parameter value from parameter registers 308 with corresponding values from threshold registers 312 to determine the state (or state information) of each parameter.

In one example, a particular parameter may be represented by a single state. The value of the parameter may be compared to one or more thresholds to determine the state of the parameter. Typically, all of the thresholds are used in the comparison, but logic may be designed that can apply a (predetermined) subset of the thresholds to the value to determine the state in order to increase computational efficiency. For example, if the monitored parameter is laser temperature, then logic can be designed that excludes thresholds that cannot be crossed at the next time of sampling. For example, if the laser temperature is 80° C., the temperature sampling rate is once per second, and the laser is known to cool at a maximum rate of 5° C./sec, then thresholds corresponding to temperatures below 75° C. can be excluded from the next comparison. Similarly, if the laser temperature is 30° C. and the laser is known to heat at a maximum rate of 10° C./sec, then at the same sampling rate, thresholds corresponding to temperatures above 40° C. can be excluded from the next comparison.

In another example, multiple states may be determined for a given parameter. For example, a value of the parameter may be compared to one or more (e.g., all or a subset of) corresponding thresholds to determine a first state. In addition, statistical analysis can be performed on multiple values of the parameter (e.g., sampled over time or from different locations) to determine a second state for the parameter (e.g., an average, a standard deviation, etc.). In a further example, a single state may be determined for multiple parameters. For example, values of multiple parameters (e.g., voltages, temperatures, or currents from multiple sources) can each be compared to a single set of thresholds to determine a single state for the multiple parameters.

In yet another example, multiple states may be determined for multiple parameters. In this case, a particular or unique set of thresholds may correspond to each parameter being monitored. For example, a particular set of thresholds for a first parameter may be utilized to determine a first state, a second set of thresholds can be used for a second parameter to determine a second state, a third set of thresholds can be used for a third parameter to determine a third state, etc. As mentioned above, statistical analysis performed on multiple values of multiple parameters (e.g., voltages or temperatures from different locations and/or sampled over time) may be used to determine additional states for the parameters.

At 410 (see FIG. 4), the determined state (or state information) may be transmitted and/or made available to the user or host. For example, referring to FIG. 3, bus and/or signal 324 may transmit the information to state information registers 316 which may then transmit the information to the user or host via bus and/or signal 332. Referring back to FIG. 4, at 412, the determined state information may also be transmitted to second comparator 334 for a comparison with stored state information stored in state information registers 316 to determine whether a state for a particular parameter has changed since a previous state was recorded or stored. A comparison (to determine whether a change of state has occurred) may be made for each parameter or for a plurality of parameters (e.g., a subset of all parameters).

A change of state may be determined by comparing the two states (i.e., the current state and a stored state). For example, referring to FIG. 3, second comparator 334 can determine whether a state has changed (e.g., when a difference is found between a current state and a corresponding stored state) by comparing current state information from first comparator 306 with corresponding stored state information from state information registers 316. Such information (e.g., a "change of state" or "no change of state") can be output to change of state registers 340 (e.g., 342-0, 342-1, 342-2, . . . 342-N), which may provide information via bus and/or signal 344 on each parameter's change of state (or lack of change). In one embodiment, the information relating to change of state may be provided as a flag to the user and/or network. Alternatively, the information relating to change of state may be expressed as a difference, a magnitude or a direction of change, etc., depending on the configuration of second comparator 334 and/or change of state registers 340.

If at 412, the state (or state information) has not changed from the previous state for a particular parameter, then the flow returns to 402 and 406 to access and/or monitor parametric data and calculate and/or retrieve threshold values. However, if at 412, the state (or state information) has changed from the previous (e.g., stored) state for a particular parameter, then the flow is directed to 414, at which the transceiver can transmit or make available the information regarding the change of state to the user or host. In one example, the transceiver can send an interrupt to the host via the communications interface (e.g., interface controller 114) when a parameter has undergone a change of state. Alternatively, an interrupt or other notification may be sent or displayed upon selected or predetermined changes of state. For example, an interrupt may be sent only when the change of state coincides with the crossing of a particular threshold, or when the change of state coincides with a change in the direction of the parameter value (e.g., a parameter value which was previously increasing is now associated with a change of state corresponding to a decreasing value).

The flow then returns to 402 and 406 to continue accessing and/or monitoring parametric data and calculating and/or retrieving threshold values. Parameter monitoring, storage of the parametric data at allocated memory locations, comparison of parametric values to threshold values, and comparison of stored states to current states may occur continuously. As a result, the system can eliminate the need for a host or user to request (or frequently request) the system to read state information.

Figure 5:
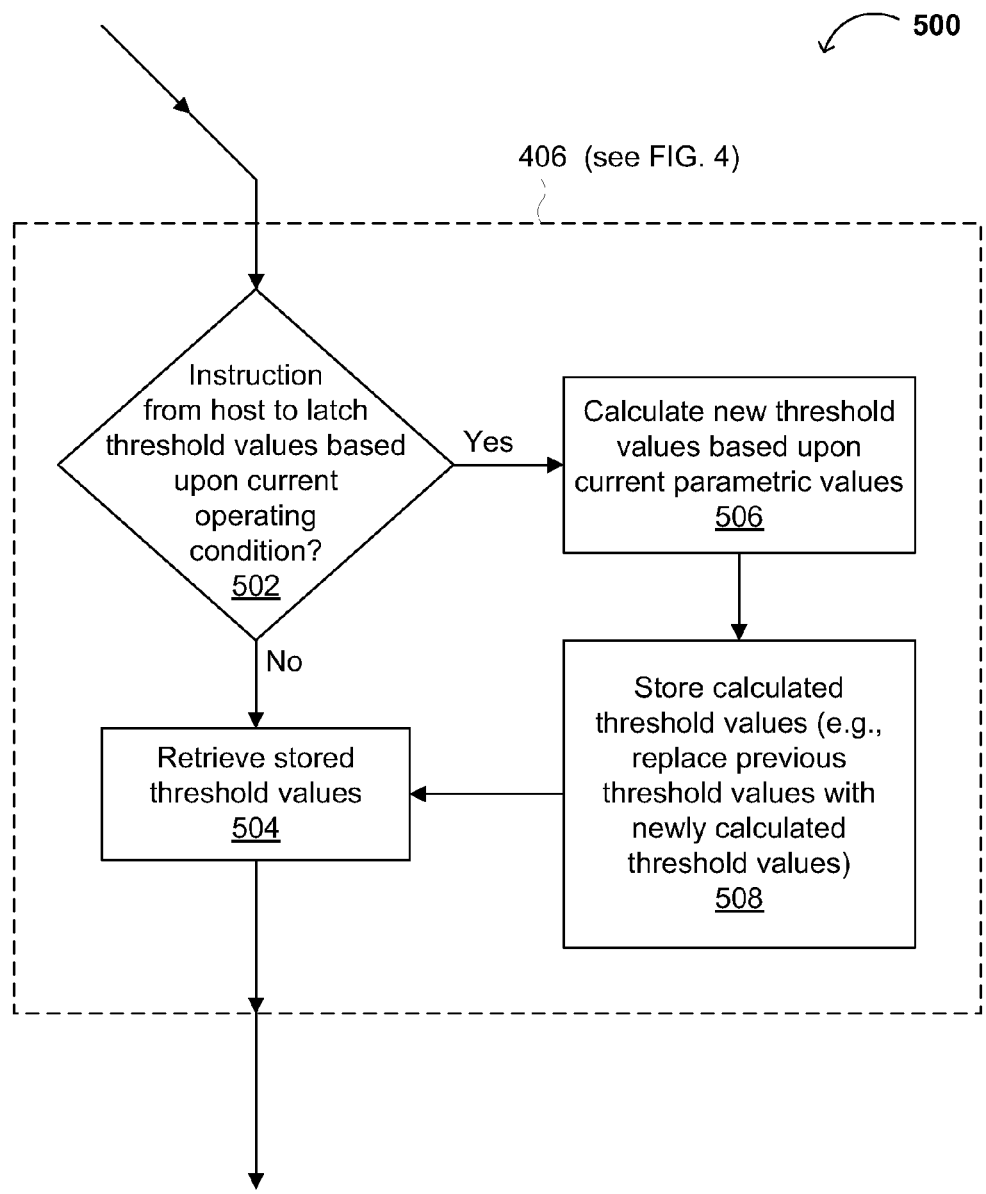
FIG. 5 is a flow diagram showing an exemplary method or sub-process related to generating operational state information in accordance with embodiments of the present invention.

FIG. 5 illustrates an exemplary method or sub-process 500 for determining whether to calculate or retrieve threshold values in accordance with additional embodiments of the present invention. Box 406 formed by the dashed line of FIG. 5 may correspond to 406 of FIG. 4. Options or sub-steps within 406 of FIG. 4 may be represented by 502, 504, 506 and 508.

At 502, the method may involve checking or acknowledging whether an instruction to latch threshold values based on current operation conditions from the host has been received. Alternatively, the method may involve checking or acknowledging whether the instruction has been received from the network, CPU 110, or instruction memory 108. In another alternative, the instruction may be to replace or update thresholds (e.g., based on a value of a second parameter or a predetermined change or occurrence of a predetermined condition in the second parameter). When an instruction to replace or update thresholds based upon a second parameter occurs, the threshold values may or may not be latched. If such an instruction (e.g., to latch the threshold values based upon current operating conditions) has not been received, then the system proceeds to 504.

At 504, stored threshold values are retrieved from a predetermined location corresponding to a predetermined parameter. Referring back to FIG. 3, the stored threshold values may be accessed by CPU 110, e.g., by using pointers to the stored threshold values to identify and/or find corresponding locations of the stored threshold values in data memory 112 (e.g., threshold registers 312). The pointers may be stored in a separate memory (e.g., separate from data memory 112) associated with CPU 110. For example, one or more (e.g., all or a subset of) threshold values from threshold registers 312 corresponding to the predetermined parameter are transmitted via bus and/or signal 320 to first comparator 306 for a subsequent determination of state (see 408 of FIG. 4).

Referring back to FIG. 5, if an instruction to latch threshold values based upon current operating conditions has been received, then at 506, current parameter values are latched, after which new threshold values are calculated based upon the latched parametric values. A detailed description of latching thresholds based upon an instruction from a user may be found in U.S. patent application Ser. No. 13/371,313, filed Feb. 10,2012, the relevant portions of which are incorporated by reference herein.

Then at 508, the calculated threshold values are stored in threshold registers 312 (e.g., the previous threshold values are replaced with the newly calculated threshold values). For example, the method may comprise sampling current parameter values, and calculating new/updated thresholds based on predetermined "guardband(s)" of the parameters (e.g., warnings [e.g., ±10-20% of target value], alarms [e.g., ±20-50% of target value], or other threshold criteria). In an alternative option, the threshold registers 312 may be programmed or re-programmed (e.g., by the host) via bus and/or signal 330. In this option, the host or other external device calculates the new/updated threshold values, optionally after reading the parameter values (e.g., from ADC register 202). Then, at 504, the newly stored threshold values are retrieved and may be transmitted via bus and/or signal 320 to first comparator 306 for a subsequent determination of state (or state information) (see step 408 of FIG. 4).

Figure 6:
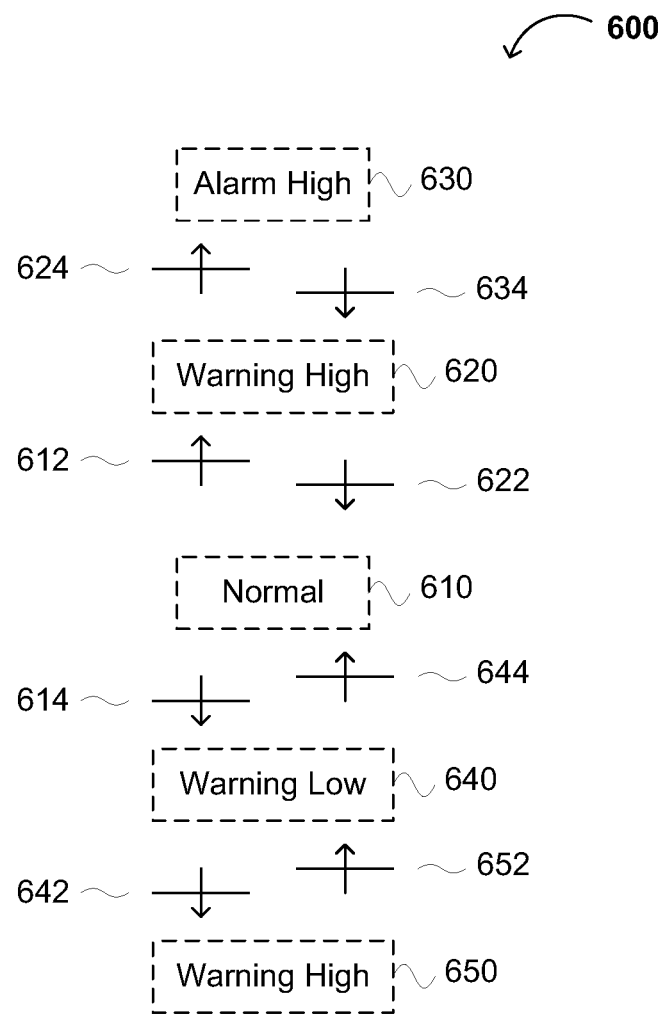
FIG. 6 is a diagram of an exemplary hysteresis function relating to state information and change-of-state information in accordance with embodiments of the present invention.

Referring to FIG. 6, a hysteresis function 600 may be included in the present method to prevent noise or other small signal changes from triggering transient and/or erroneous generation of a different state. The hysteresis function 600 may prevent toggling between logically adjacent states when a parametric value is near a particular threshold. In one example, a parametric value which is in a normal range 610 and increases to a point at which it crosses threshold 612 (e.g. 10% or 15% above a target value) will trigger a change of state indication from "normal" 610 to "warning high" 620. However, a change of state indication from "warning high" 620 back to "normal" 610 will not be triggered until the parametric value decreases to a point at which it crosses threshold 622, which is less than the value or magnitude of threshold 612 (e.g., 7.5% or 12.5% above the target value). Similarly, a parametric value which increases to a point at which it crosses threshold 624 (e.g., 30% above the target value) will trigger a change of state indication from "warning high" 620 to "alarm high" 630. But a change of state indication from "alarm high" 630 back to "warning high" 620 will not be triggered until the parametric value decreases to a point at which it crosses threshold 634, which is less than the value or magnitude of threshold 624 (e.g., 25% above the target value).

Likewise, a parametric value which is in a normal range 610 and decreases to a point at which it crosses threshold 614 (e.g., 10% or 15% below a target value) will trigger a change of state indication from "normal" 610 to "warning low" 640. However, a change of state indication from "warning low" 640 back to "normal" 610 will not be triggered until the parametric value increases to a point at which it crosses threshold 644, which is more than the value or magnitude of threshold 614 (e.g., 7.5% or 12.5% below the target value). Similarly, a parametric value which decreases to a point at which it crosses threshold 642 (e.g., 30% below the target value) will trigger a change of state indication from "warning low" 640 to "alarm low" 650. But a change of state indication from "alarm low" 650 back to "warning low" 640 will not be triggered until the parametric value increases to a point at which it crosses threshold 652, which is more than the value or magnitude of threshold 642 (e.g., 25% below the target value).

Thus, a direction of change (increasing value vs. decreasing value) must be known in order to determine whether a threshold has been crossed. The direction of change may be determined by comparing a current parameter value to a previous value of that parameter. If the current value is greater than the previous value, then the value is determined to be increasing. If the current value is less than the previous value, then the value is determined to be decreasing. Whether a threshold has been crossed may be determined by comparing both the current value and the previous value to the corresponding threshold value(s). For example, for an "increasing threshold" (e.g., 612 or 624), if the current value is greater than or equal to the threshold value, and the previous value is less than the threshold value, then the value is determined to have crossed the "increasing threshold." Likewise, for a "decreasing threshold" (e.g., 624 or 634), if the current value is less than the threshold value, and the previous value is greater than or equal to the threshold value, then the value is determined to have crossed the "decreasing threshold."

In the embodiment of FIG. 6, there are four hysteresis thresholds related to the parameter value. A "hysteresis threshold" is a threshold that has different values, depending on whether the parameter is moving away from normal (e.g., increasing beyond the warning high threshold 612, decreasing below the alarm low threshold 642, etc.; the "away direction") or returning to normal (e.g., decreasing below the alarm high threshold 634, increasing beyond the warning low threshold 644, etc.; the "return direction"). In one example, when calculated as a percentage difference from the target parameter value, the hysteresis thresholds have absolute values in the away direction that are greater than in the return direction. The values of the hysteresis thresholds in the return direction may be calculated as a function of the corresponding away direction values. For example, the return direction values may be from 0.1% to 50% (e.g., 1-5%, or any range of values therein) less than the corresponding away direction values. In another example, hysteresis warning thresholds may have a smaller gap in directional values than hysteresis alarm thresholds. For example, the return direction values of the hysteresis warning thresholds may be 1% less than the corresponding away direction values, but the hysteresis alarm thresholds may have a gap in directional values of 2-5%. Of course, other suitable percentages or absolute differences in directional values of hysteresis thresholds may be chosen, depending on design and/or performance considerations.

The hysteresis function may also use four or more thresholds to indicate both state and direction information. For example, in a relatively simple case, the thresholds may be high increasing, high decreasing, low decreasing, and low increasing. The hysteresis function 600 of FIG. 6 may employ eight thresholds (although functions using more or fewer thresholds are contemplated). For example, the threshold values corresponding to "warning high increasing" 612 and "warning high decreasing" 622 may be spaced apart by approximately 2.5% or 5% from each other or from a target value (e.g., 612 may be a value 10% above a target value, and 622 may be a value 7.5% above the target value, for a difference of 2.5%), or another suitable predetermined amount. The spacing does not have to be based upon percentage difference between the two values, but could also be an absolute value (e.g., a specific number of degrees for a temperature parameter). The spacing between associated (e.g., "on/off") pairs of thresholds (e.g., "high increasing" and "high decreasing," or "low decreasing" and "low increasing") can be chosen to be narrow enough to provide an accurate and/or reliable warning or alarm, but wide enough to prevent an excessive and/or undesired degree of toggling between states.

Similarly, the threshold values corresponding to "alarm high increasing" 624 and "alarm high decreasing" 634 may be spaced apart by approximately 2.5% or 5%, or another suitable predetermined amount. The spacing may be the same as the spacing between the "warning high increasing" 612 and "warning high decreasing" 622 thresholds or may be different. The threshold values corresponding to "warning low decreasing" 614 and "warning low increasing" 644 may be spaced apart by approximately 2.5% or 5%, or another suitable predetermined amount. The threshold values corresponding to "alarm low decreasing" 642 and "alarm low increasing 652" may also be spaced apart by approximately 2.5% or 5%, or another suitable predetermined amount. As mentioned above, the spacing may be different for different pairs of associated thresholds.

Thus, toggling between logically adjacent states, and noise or other small signal changes triggering transient and/or erroneous generation of a different state, can be prevented by using hysteresis function 600.

Exemplary Software

The present invention also includes algorithms, computer program(s) and/or software, implementable and/or executable in an embedded device, such as a network switch, router, etc., or a general purpose computer or workstation equipped with a conventional digital signal processor, configured to perform one or more steps of the method and/or one or more operations of the hardware. Typically, in the present disclosure, the host is such an embedded device. Thus, a further aspect of the invention relates to algorithms and/or software that implement the above method(s). For example, the invention may further relate to a (non-transitory) computer program or computer-readable medium containing a set of instructions which, when executed by an appropriate processing device/logic (e.g., a signal processing device, such as a microcontroller, microprocessor or DSP device), is configured to perform the above-described method and/or algorithm.

For example, the computer program may be on any kind of readable medium, and the computer-readable medium may comprise any (non-transitory) medium that can be read by a processing device configured to read the medium and execute code stored thereon or therein, such as a floppy disk, CD-ROM, magnetic tape or hard disk drive. In some embodiments, the part or parts of the software and/or algorithm(s) that reside in the host may be included in general purpose computer software (e.g., a driver), encoded and/or stored on such a medium. Such code may comprise object code, source code and/or binary code.

In the present disclosure, the code is generally configured for transmission through an appropriate medium, such as copper wire, a conventional twisted pair wireline, a conventional network cable, a conventional optical data transmission cable, or even air or a vacuum for wireless signal transmissions, as are signals generated in accordance with the code or hardware executing the code. The code for implementing the present method(s) is generally digital, and is generally configured for processing by a conventional digital data processor (e.g., a microprocessor, microcontroller, or logic circuit such as a programmable gate array, programmable logic circuit/device or application-specific [integrated] circuit).

In various embodiments, the computer-readable medium comprises a set of instructions to generate operational state information, including instructions to (i) access and/or monitor parametric data for each of a plurality of parameters that are related to operation of the device (e.g., an optical transceiver); (ii) store the parametric data in one or more memories; (iii) compare the parametric data for each of the plurality of parameters against at least one of a corresponding plurality of predetermined thresholds; and (iv) generate one or more states indicating whether the parametric data for a unique one of the parameters has crossed one or more of the corresponding plurality of predetermined thresholds. The computer-readable medium may also comprise instructions to (a) monitor a second parameter on which the predetermined threshold(s) are based, calculate new thresholds based upon a predetermined change or event in a value of the second parameter, and store the new thresholds in memory, (b) determine whether the generated state of the parameter(s) differs from a corresponding stored state of the parameter(s) (which may comprise an instruction to compare the generated state against the corresponding stored state), and/or (c) store the predetermined thresholds and the stored state(s) in the memory or memories.

CONCLUSION

Embodiments of the present invention advantageously provide for more accurate and more detailed information regarding the operational status of an optical transceiver. Particular embodiments also utilize an approach that calculates an operational state by comparing parametric data to threshold values. Embodiments of the present invention can also provide an approach which determines (and notifies a user of) a change of operational state by comparing a current operational state to a stored/previous operational state for a given parameter. Embodiments of the present invention further provide a method whereby the information for each state may be contained in a multi-bit code. Embodiments of the present invention allow for more accurate and more detailed information relating to operational parameters, resulting in improved operational status determinations for an optical transceiver.

While the above examples include particular implementations of registers and other memory arrangements, as well as multiplexers and comparators, one skilled in the art will recognize that other technologies and arrangements may also be used in accordance with embodiments. For example, other digital logic or elements can be used in certain embodiments. Further, one skilled in the art will recognize that other forms of signaling and/or control (e.g., current-based signaling, flag-based signaling, differential signaling, etc.) may also be used in accordance with various embodiments.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An optical transceiver, comprising:
   a) an optical receiver configured to receive optical data;
   b) an optical transmitter configured to transmit optical data;
   c) one or more memories configured to store, for each of a plurality of parameters that are related to operation of at least one of said optical receiver and said optical transmitter, (i) parametric data, (ii) a plurality of thresholds, and (iii) one or more states of a plurality of states indicating whether a corresponding one of said plurality of parameters has crossed at least one of said plurality of thresholds, said plurality of states comprising at least $2^N$ states represented using at least N bits, where N is an integer not less than three, wherein a first one of said plurality of thresholds represents a low threshold limit for one or more of said plurality of parameters, and a second one of said plurality of thresholds represents a high threshold limit for said one or more of said plurality of parameters, and remaining ones of said plurality of states correspond to a plurality of predetermined thresholds, at least one normal operational state between said low threshold limit and said high threshold limit, and one or more other states, the one or more other states being selected from a failure state, a don't care state, an additional normal operational state, and an additional state corresponding to an additional predetermined threshold;
   d) logic configured to compare said parametric data for each of one or more of said plurality of parameters against at least a corresponding one of said plurality of thresholds to generate one of said one or more states; and
   e) an interface configured to provide (i) said one or more states and/or (ii) a plurality of status flags for said one or more of said plurality of parameters, said status flags corresponding to or decoded from at least a most recent one of said one or more states stored in said memory.

2. The optical transceiver of claim 1, wherein said logic comprises a microcontroller, a microprocessor, an application specific integrated circuit, a field programmable gate array, a programmable logic device, or a system-on-chip.

3. The optical transceiver of claim 1, wherein said logic is further configured to compare each of said one or more generated states against one or more corresponding stored states to determine whether the state for the corresponding one of said one or more parameters has changed, and said interface is further configured to indicate whether the state for the corresponding one of said one or more parameters has changed.

4. The optical transceiver of claim 1, further comprising one or more analog-to-digital converters (ADCs), wherein said one or more memories comprises one or more registers corresponding to said one or more ADCs, and each of said one or more registers is configured to store data for at least one of said parameters.

5. The optical transceiver of claim 1, wherein said plurality of parameters comprise at least two members of the group consisting of laser temperature, module temperature, optical receiver temperature, a voltage, a bias current, a transmitted optical digital power, a received optical digital power, a received optical video power, a radio-frequency (RF) output power, a modulation amplitude, and a laser wavelength.

6. The optical transceiver of claim 1, wherein said logic comprises a first comparator configured to compare the parametric data against said at least one of said plurality of thresholds.

7. The optical transceiver of claim 6, wherein said logic comprises a second comparator configured to compare said one or more generated states against said one or more corresponding stored states to determine whether the state for the corresponding one of said one or more parameters has changed.

8. The optical transceiver of claim 1, wherein the one or more memories are further configured to store a plurality of change-of-state indicators for each of said one or more states.

9. The optical transceiver of claim 1, wherein said logic is configured to compare a bit-reduced version of said one or more of said plurality of parameters against a corresponding bit-reduced version of at least one of a corresponding plurality of thresholds.

10. The optical transceiver of claim 1, wherein said one or more memories comprises (i) a first volatile memory block configured to store said plurality of thresholds, (ii) a second volatile memory block configured to store parametric data, and (iii) a third volatile memory block configured to store said one or more states.

11. An optical triplexer, comprising the optical transceiver of claim 1.

12. The optical transceiver of claim 1, wherein the logic includes a hysteresis function.

13. The optical transceiver of claim 1, wherein said one or more other states include at least two of the failure state, the don't care state, the additional normal operational state, and the additional state corresponding to an additional predetermined threshold.

14. A method of generating operational state information in an optical transceiver, the method comprising:
   a) accessing and/or monitoring parametric data for each of a plurality of parameters that are related to operation of said optical transceiver;
   b) storing said parametric data in one or more memories;
   c) comparing said parametric data for each of said plurality of parameters against at least one of a corresponding plurality of predetermined thresholds; and
   d) generating at least one of a plurality of states indicating whether said parametric data for a unique one of said parameters has crossed one or more of the corresponding plurality of predetermined thresholds, said plurality of states comprising at least eight states represented using at least three bits, wherein a first one of said plurality of thresholds represents a low threshold limit for one or more of said plurality of parameters, and a second one of said plurality of thresholds represents a high threshold limit for said one or more of said plurality of parameters, and remaining ones of said plurality of states correspond to a plurality of predetermined thresholds, at least one normal operational state between said low threshold limit and said high threshold limit, and one or more other states, the one or more other states being selected from a failure state, a don't care state, an additional normal operational state, and an additional state corresponding to an additional predetermined threshold.

15. The method of claim 14, wherein generating said one or more state indicators comprises:
   a) determining an N-bit version of said parametric data for at least one of said one or more of said plurality of parameters, wherein said parametric data comprises M bits, and M is greater than N; and b) comparing said N-bit versions of said parametric data against corresponding N-bit versions of said at least one of said corresponding plurality of predetermined thresholds.

16. The method of claim 14, further comprising changing or updating one or more of said plurality of predetermined thresholds.

17. The method of claim 16, wherein changing or updating one or more of said plurality of predetermined thresholds comprises:

a) monitoring a second parameter on which said one or more of said plurality of predetermined thresholds are based; and b) calculating new thresholds upon a predetermined change or event in a value of said second parameter, and storing the new thresholds in the memory.

18. The method of claim 17, wherein storing the new thresholds comprises replacing the predetermined thresholds with the new thresholds.

19. The method of claim 14, further comprising determining whether the generated state of one or more of said plurality of parameters differs from a corresponding stored state of said one or more of said plurality of parameters.

20. The method of claim 19, comprising comparing said generated state against said corresponding stored state.

21. The method of claim 14, further comprising storing the predetermined thresholds and the stored states in the one or more memories.

22. The method of claim 14, wherein generating one or more states includes a hysteresis function.

\* \* \* \* \*